US006965924B1

(12) United States Patent
Gerthe

(10) Patent No.: US 6,965,924 B1
(45) Date of Patent: Nov. 15, 2005

(54) METHOD AND SYSTEM FOR TRANSPARENT FILE PROXYING

(75) Inventor: John David Gerthe, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/558,201

(22) Filed: Apr. 26, 2000

(51) Int. Cl.[7] .............................................. G06F 15/16
(52) U.S. Cl. ...................... 709/218; 709/217; 709/248; 709/246; 709/229
(58) Field of Search ................................ 709/203, 216, 709/217, 218, 219, 229, 238, 225, 246, 248; 711/113, 118, 150, 152

(56) References Cited

U.S. PATENT DOCUMENTS

| | | | | |
|---|---|---|---|---|
| 5,452,447 | A * | 9/1995 | Nelson et al. ............... | 707/205 |
| 5,805,809 | A * | 9/1998 | Singh et al. ................. | 709/203 |
| 5,852,717 | A * | 12/1998 | Bhide et al. ................. | 709/203 |
| 5,884,046 | A * | 3/1999 | Antonov ...................... | 709/238 |
| 5,987,506 | A * | 11/1999 | Carter et al. ................. | 709/213 |
| 6,101,607 | A * | 8/2000 | Bachand et al. ............. | 713/201 |
| 6,192,408 | B1 * | 2/2001 | Vahalia et al. ............... | 709/229 |
| 6,324,584 | B1 * | 11/2001 | Mandalia ..................... | 709/238 |
| 6,339,787 | B1 * | 1/2002 | Yohe et al. .................. | 709/217 |
| 6,381,602 | B1 * | 4/2002 | Shoroff et al. ................. | 707/9 |
| 6,389,462 | B1 * | 5/2002 | Cohen et al. ................ | 709/218 |
| 6,393,526 | B1 * | 5/2002 | Crow et al. .................. | 711/137 |
| 6,606,650 | B2 * | 8/2003 | Hughes et al. ............... | 709/213 |

* cited by examiner

*Primary Examiner*—Rupal Dharia
*Assistant Examiner*—Kristie Shingles

(57) ABSTRACT

A method and system for transparent file proxying allows an intelligent storage appliance (ISA) that connects a remote computer connected to a local area network (LAN) through a wide area network (WAN) to locally provide to the remote computer files that would otherwise be obtained from a computing device connected to the LAN over the WAN. Based upon policies that include user policies, group policies and corporate policies, selected files are transferred (or mirrored) from the computing devices connected to the LAN to the ISA. When the remote computer desires to access a file, the ISA intercepts and analyzes the file request. If the ISA determines that the requested file is one that is locally stored on the ISA, the ISA intercepts and services the request locally (thereby preventing the request from traversing the WAN), and transparently proxies the selected file to the remote computer. A user of the remote computer views the file, unaware that the file is locally provided by the ISA. If the user modifies the file, the ISA forwards data necessary to reconstruct a modified copy of the file to a computing device connected to the LAN, thereby maintaining file integrity between the file located on a computing device connected to the LAN and the copy locally stored on the ISA. Similarly, if a file that is locally stored on the ISA is modified while on the computing device connected to the LAN, data necessary to reconstruct an updated version of the file is forwarded (mirrored) to the ISA.

10 Claims, 6 Drawing Sheets

METHOD AND SYSTEM FOR TRANSPARENT FILE PROXYING

TECHNICAL FIELD

The present invention relates generally to computer networking, and, more particularly, to a method and system that allow transparent file proxying from a local area network (LAN) to a remote user connected to the LAN via a wide area network (WAN).

BACKGROUND OF THE INVENTION

Remote connection to a local network, such as in the case of a telecommuter dialing in to the corporate network from home or while traveling, is becoming more and more ubiquitous. Typically, a remote user will dial in to the corporate network via a wide area network (WAN), such as the public switched telephone network (PSTN), via a modem. The remote user will then access computing devices located at the corporate location, typically over a local area network (LAN). Due to the available bandwidth and channel capacity, the access speed of the LAN is typically many times greater than the access speed of the WAN. The computing devices accessed by the remote user are typically referred to as "server systems" or "servers." The servers contain the files that the remote user wishes to access and work on. In conventional dial-in arrangements, the remote user must communicate over both the WAN (to access the corporate location) and the LAN (to access the files located on the servers that are connected to the LAN). Unfortunately, this arrangement consumes time and processing resources because of the typically restricted access speed of the WAN.

Therefore, there is a need for a system in which a remote user may access files located on a corporate LAN without the need for accessing the WAN for each file request.

SUMMARY OF TH INVENTION

The invention can be conceptualized as a method for transparent file proxying comprising the following steps. Each of a plurality of computing devices is coupled to a local area network. At least one of the plurality of computing devices includes the ability to route communication packets to the remaining plurality of computing devices and each of the plurality of computing devices includes a memory element containing a plurality of files. At least one of the plurality of computing devices is coupled to a communication network and a remote memory element is also coupled to the communication network. The remote memory element is configured to maintain a file selected from the plurality of files contained in the memory elements of each of the plurality of computing devices. A remote computing device is coupled to the remote memory element. The remote memory element intercepts a communication message from the remote computing device and provides the selected file to the remote computing device when the remote memory element intercepts a communication message requesting the selected file from one of the plurality of computing devices connected to the local area network.

In architecture, the invention is a system for transparent file proxying, comprising a local network to which is coupled a plurality of computing devices. At least one of the plurality of computing devices includes the ability to route communication packets to the remaining plurality of computing devices and each of the plurality of computing devices includes a memory element containing a plurality of files. A communication network is coupled to at least one of the plurality of computing devices. A remote memory element is coupled to the communication network and is configured to maintain a file selected from the plurality of files contained in the memory elements of each of the plurality of computing devices. A remote computing device is connected to the remote memory element. The remote memory element is configured to intercept communication messages from the remote computing device, wherein the remote memory element is configured to provide the selected file to the remote computing device when the remote memory element intercepts a communication message requesting the selected file from one of the plurality of computing devices connected to the local network from the remote computing device.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

Although the preferred embodiment of the method and system for transparent file proxying will be described in the context of a remote user connecting to a corporate LAN via a dial-up (modem) connection, the invention is applicable to any remote user that accesses files located on a computing device connected to a LAN via a link that is slower than a LAN such as a WAN.

The method and system for transparent file proxying can be implemented in hardware, software, firmware, or a combination thereof. In the preferred embodiment(s), the invention is implemented in a combination of hardware and software or firmware. The software or firmware can be stored in a memory and can be executed by a suitable instruction execution system. If implemented in hardware, as in an alternative embodiment, the invention can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The software portion of the method and system for transparent file proxying, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
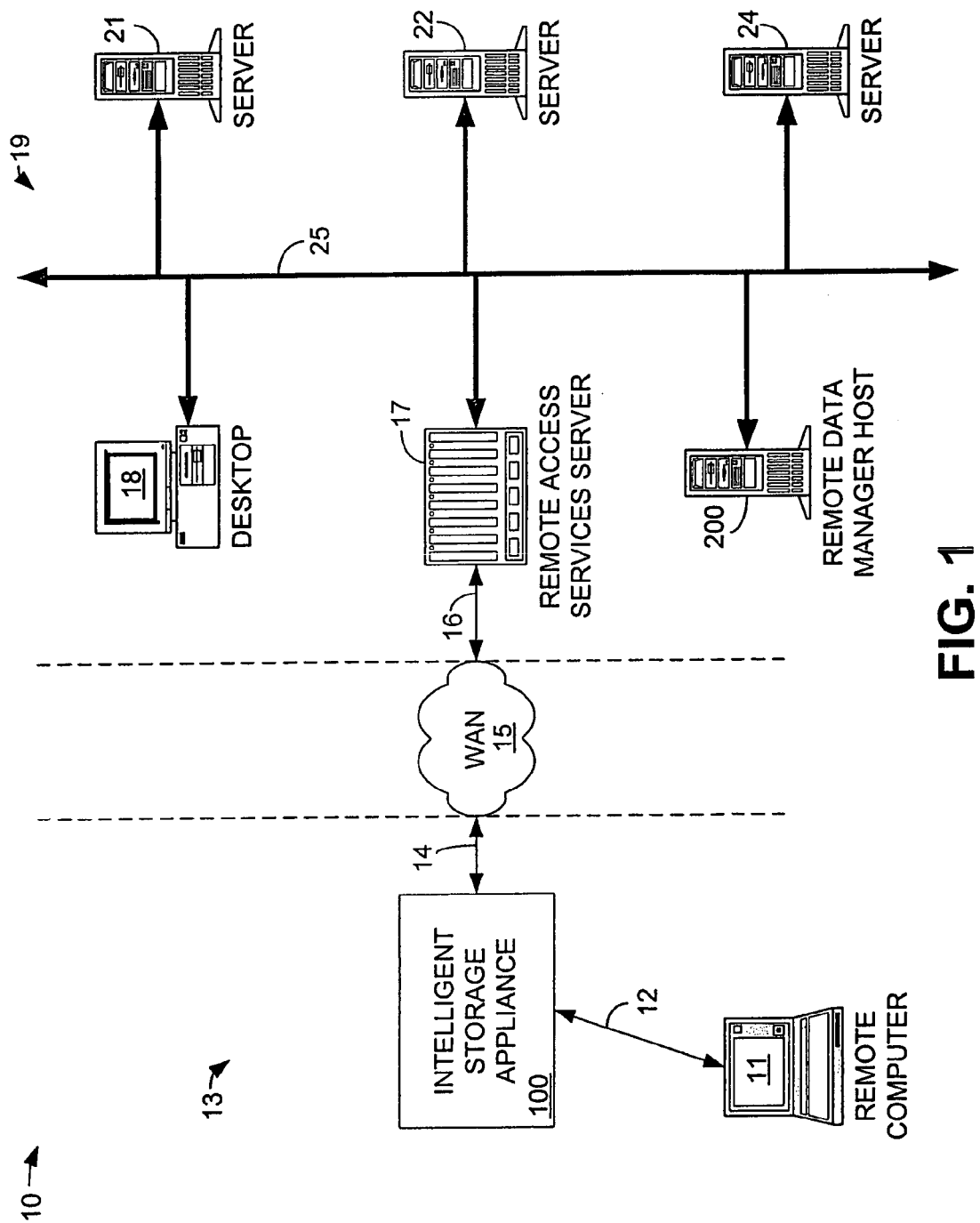
FIG. 1 is a schematic view illustrating a network environment in which the intelligent storage appliance (ISA) of the invention resides.

Turning now to the drawings, FIG. 1 is a schematic view illustrating a network environment 10 in which the intelligent storage appliance (ISA) 100 of the invention resides. Network environment 10 includes corporate LAN portion 19 and remote client network portion 13. Corporate LAN portion 19 includes a plurality of computing devices connected via a LAN 25. LAN 25 can be any local area network, for example but not limited to, an Ethernet, token ring, or any other local area network. A plurality of computing and storage devices, such as servers 21, 22 and 24 are connected to LAN 25. Servers 21, 22 and 24 typically store files in memory that can be accessed by users operating computers connected to the LAN 25. For example, desktop computer 18 connected to LAN 25 may be used to access a file maintained on server 21, such as, for example but not limited to, a word processing document, a graphics file, etc. In this manner, any number of desktop computers can be connected to LAN 25 and have access to shared files on servers 21, 22 and 24. It should be noted that although three servers are shown, many more servers are contemplated. Similarly, although only one desktop computer 18 is illustrated in FIG. 1 for simplicity, it is assumed that many tens or hundreds of desktop computers can be connected to LAN 25. Furthermore, each of the servers 21, 22 and 24, as well as desktop computer 18 include memory, processing and software elements (not shown) as known to those having ordinary skill in the art.

Corporate LAN portion 19 also includes a remote access services (RAS) server 17 and remote data manager (RDM) host processor 200 connected to LAN 25. In accordance with an aspect of the invention, RAS server 17 provides a connection 16 between LAN 25 and a wide area network (WAN) 15. WAN 15 can be, for example but not limited to, the public switched telephone network (PSTN), a general switched telephone network (GSTN), or any public data network (PDN).

In accordance with an aspect of the invention, it is oftentimes desirable for someone who has access to LAN 25 while working in the corporate environment to also have access to LAN 25 remotely. For example, an employee of the corporation that maintains LAN 25 might desire to work from home. This is commonly referred to as telecommuting. In such an instance, the employee might use remote computer 11 to gain access, via WAN 15 through RAS server 17, to computing devices (i.e., servers 21, 22 and 24) located on LAN 25. If connecting directly through WAN 15, RAS server 17 and LAN 25 to gain access to a file located on server 21, 22 or 24, each command from the remote computer 11 must travel across the WAN 15 and into the corporate LAN portion 19.

In accordance with an aspect of the invention, ISA 100 is located at the remote client network portion 13 and connected between the remote computer 11 and WAN 15. By executing software instructions located within the ISA 100 and the RDM host processor 200, which is connected both to LAN 25 and the WAN 15, commands from the remote computer 11 sent to ISA 100 via connection 12 are analyzed by the ISA 100 to determine whether the ISA 100 can satisfy locally the requested service. For example, perhaps the ISA 100 can provide locally a file requested by remote computer 11. In cooperation with the RDM host processor 200, and in accordance with a predefined set of policies (to be defined in detail below), the ISA 100 will maintain mirror copies of files that are located on devices connected to the LAN 25 that a user of the remote computer 11 may wish to access and can provide those files in a more timely manner than would normally be available across a WAN. In this manner, it is not always necessary for remote computer 11 to access LAN 25 via WAN 15 in order to view and manipulate the desired files. The above mentioned policies can include user policies, group policies and corporate policies and will be defined in further detail below. For example, the set of policies within which ISA 100 and RDM host processor 200 operate to provide mirrored files to the ISA 100 can be specific to remote computer 11. In this manner, the ISA 100 can be specifically tailored to provide only files authorized for a particular user. Although shown with one ISA 100 connecting one remote computer 11 to WAN 15, it is contemplated that a number of ISA devices 100 can connect a plurality of remote computers 11 through WAN 15 into LAN 25.

Essentially, ISA 100, according to the policies defined, exchanges mirrored files with RDM host processor 200 via WAN 15 and via RAS server 17. The files maintained by, and mirrored between, the ISA 100 and the RDM host processor 200 are a portion of those files maintained within servers 21, 22 and 24, as chosen by RDM host processor 200 based upon the policies in effect for the particular user, or users, of the ISA 100. In accordance with an aspect of the invention, any files maintained by ISA 100 and modified by remote computer 11 will be mirrored back to RDM host processor 200, via WAN 15 and RAS server 17, so that the corresponding file within one of the servers 21, 22 or 24 connected to the LAN 25 can be commensurately updated. In this manner, although the file stored by the ISA 100 is a copy of the file that might reside on one of the servers connected to LAN 25, the files are always mirror images of each other. In this manner, the integrity of the files is maintained.

In accordance with an aspect of the invention, ISA 100 monitors communication packets sent by remote computer 11 to devices connected to LAN 25 via WAN 15. If the ISA 100 determines that a requested file is locally stored on the ISA 100, the ISA 100 will intercept and service the communication packet itself, thereby preventing the communication packet from traversing the WAN 15. In this manner, the ISA 100 locally provides the requested file, which is stored locally on the ISA 100, directly to the remote computer 11. As far as the user of the remote computer 11 is concerned, the user requests and receives the requested file at the speed available on the LAN 12. Typically, LAN access speeds are much higher than WAN access speeds. The user of the remote computer 11 does not know or care whether the file is obtained from one of the servers located on LAN 25, or whether the file is provided locally by the ISA 100. In this manner, the ISA 100 transparently proxies the requested file to remote computer 11, thereby eliminating the requirement that the communication packet, including the request for the file, traverse the WAN 15.

Figure 2:
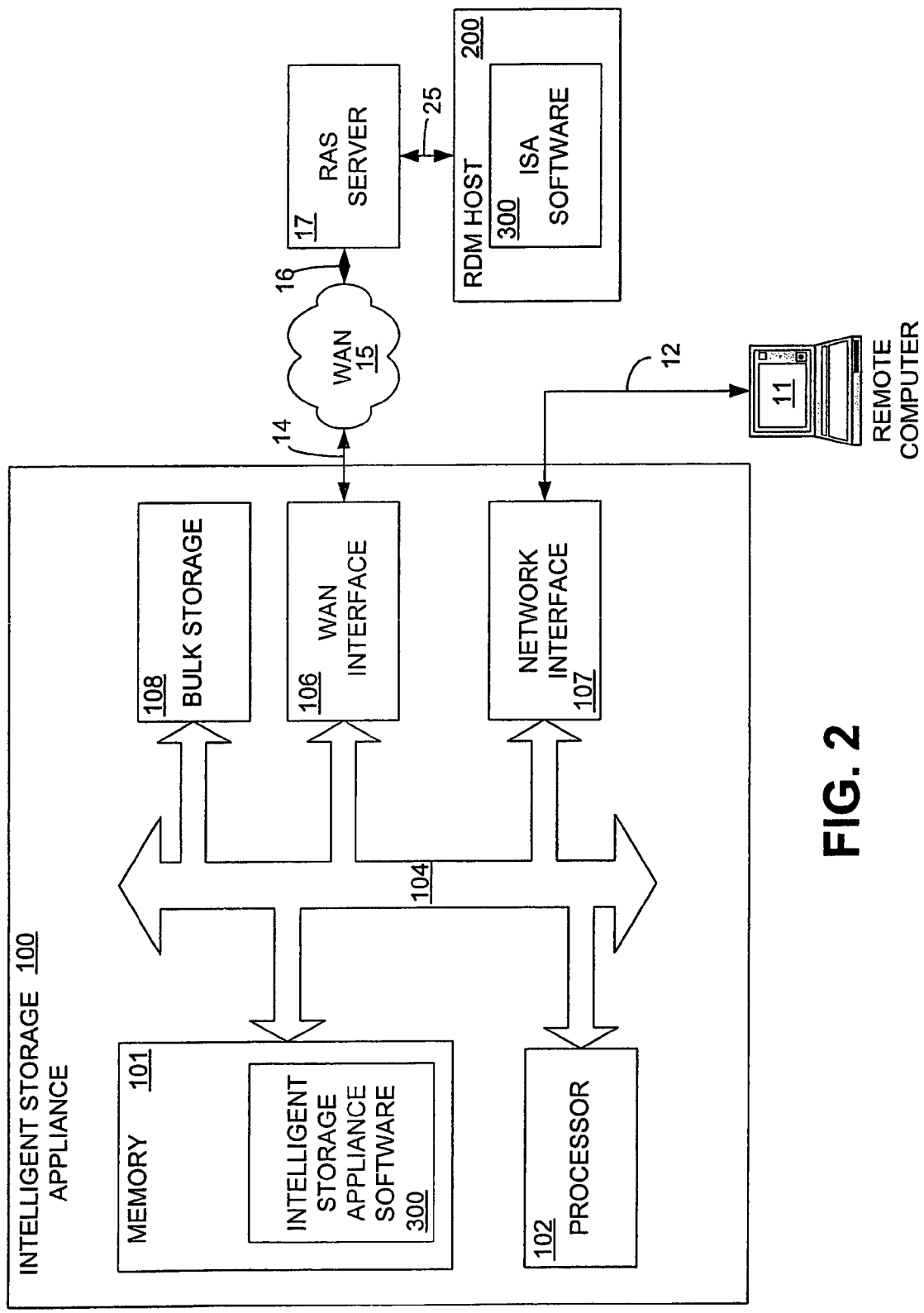
FIG. 2 is a block diagram illustrating, in further detail, the ISA and remote data manager (RDM) host processor in accordance with an aspect of the invention.

FIG. 2 is a block diagram illustrating, in further detail, the ISA 100 and RDM host processor 200 in accordance with an aspect of the invention. ISA 100 includes memory 101, processor 102, WAN interface 106 and network interface 107 in communication via logical bus 104. Memory 101 includes the ISA software 300 of the invention. The ISA software 300 is stored in memory 101 and executed in processor 102. ISA 100 also includes bulk storage element 108, which can be, for example but not limited to, a disk drive. WAN interface 106 connects ISA 100, via connection 14, to WAN 15, which is connected to RAS server 17 via connection 16. RDM host processor 200 connects, via LAN 25, to RAS server 17 and includes a portion of the ISA software 300 of the invention. The ISA software 300 is shown as residing in both RDM host processor 200 and in ISA 100 because portions of the software are executed by both the ISA 100 and the RDM host processor 200 in order to provide the functionality of the invention. Network interface 107 connects ISA 100 via connection 12 to remote computer 11.

Figure 3A:
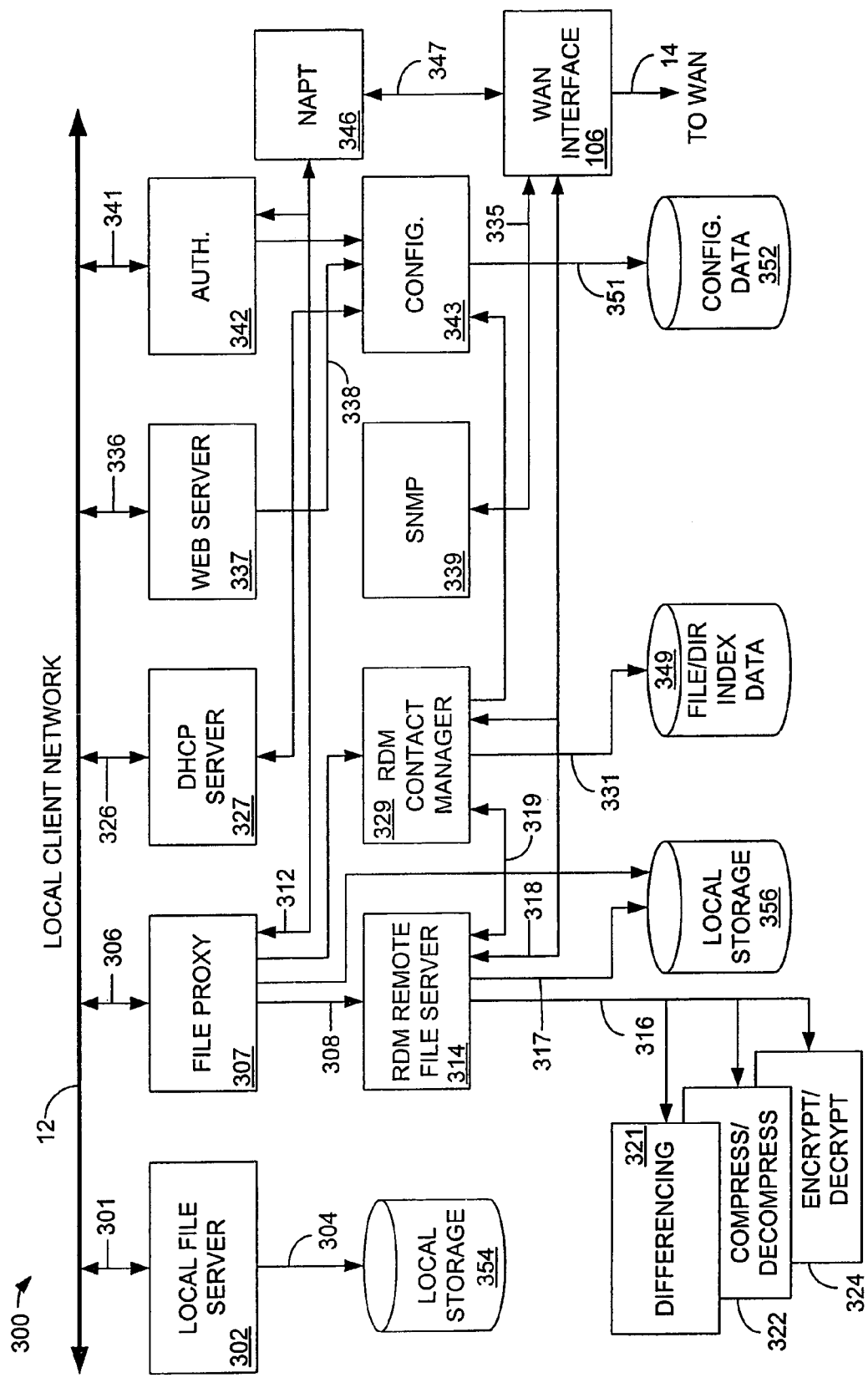
FIGS. 3A and 3B collectively illustrate, via block diagrams, the operation of the ISA software of the invention.
Figure 3B:
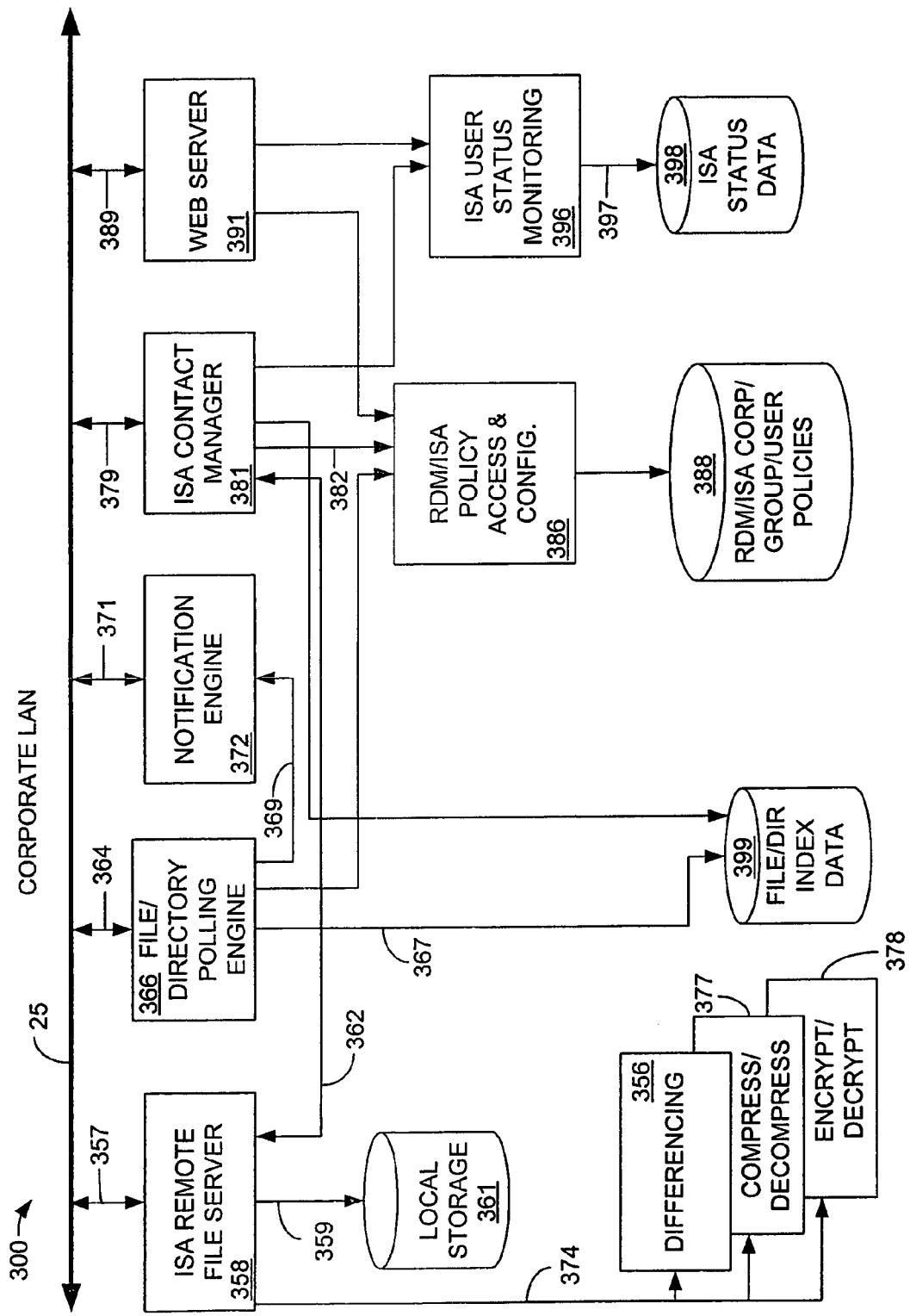

FIGS. 3A and 3B collectively illustrate, via block diagrams, the operation of the ISA software 300 of the invention. Generally, the processing depicted in FIG. 3A occurs in the ISA 100 and the processing depicted in FIG. 3B occurs within RDM host processor 200.

Referring now to FIG. 3A, local file server element 302 connects to local client network 12 via connection 301. Local client network 12 is the connection between the remote computer 11 and the ISA 100. Local client network 12 is called a network in FIG. 3A because it is assumed that multiple remote computers could connect to a single ISA 100. Local file server element 302 is a software element that provides requested files to remote computer 11 in a conventional manner, and not associated with the proxying of the invention. Local file server element 302 is associated with local storage device 354 via connection 304. Local storage device 354, and local storage device 356, are different portions of bulk storage device 108 of FIG. 2. It is assumed that the bulk storage device 108 of FIG. 2 is a multiple gigabyte disk drive that can be partitioned into a number of different local storage elements, or devices. While a portion of the bulk storage element 108 is devoted to the transparent file proxying of the present invention (i.e., local storage device 356), a portion of the bulk storage device 108 is made available to the local file server for other functions (i.e., local storage device 354).

File proxy element 307 is a software routine that is connected to local client network 12 via connection 306. File proxy element 307 detects communication packets from remote computer 11 that are destined for one of the devices connected to LAN 25 (FIG. 1). When file proxy element 307 detects a communication message that includes a request for a file that is stored on one of the servers 21, 22 or 24 connected to LAN 25, and also stored locally on the ISA 100, the file proxy element 307 will provide that requested file from local storage element 356 to the remote computer 11.

Dynamic host configuration protocol (DHCP) server 327 connects to local client network 12 via connection 326. DHCP server 327, as known in the art, assigns a temporary Internet Protocol (IP) address to the ISA 100 when it first connects to WAN 15. Web server 337 connects to local client network 12 via connection 336 and connects to configuration element 343 via connection 338. In this manner, ISA 100 can be monitored via the world wide web and, through the operation of web server 337, can be monitored and updated by a user with a computer, such as remote computer 11, connected to local client network 12.

Authentication block 342 connects to local client network 12 via connection 341 and provides access control by preventing unauthorized remote computers 11 from accessing either the WAN interface 106 or any of the local storage 356. Configuration block 343 communicates with configuration database 352 via connection 351 and provides configuration information for ISA 100. Configuration block 343 uses the user policies, group policies and corporate policies that are stored on configuration database 352 to allow the ISA 100 and the RDM host processor 200 to determine the files that are mirrored between the ISA 100 and the devices (servers 21, 22 and 24) connected to the corporate LAN 25.

File proxy element 307 also communicates with network address port translation (NAPT) element 346 via connection 312 so that the IP addresses associated with the ISA 100 will be hidden behind the DHCP address assigned by DHCP server 327. NAPT element 346 communicates with WAN interface 106 via connection 347 to enable the ISA 100 to gain access to WAN 15 via connection 14.

RDM remote file server 314 connects to file proxy element 307 via connection 308 and also connects to local storage element 356 via connection 317. RDM remote file server 314 updates the files on the RDM host processor 200 that correspond to the files locally stored on the ISA 100 in local storage element 356 when the files are updated by a user of the remote computer 11. In this manner, any files that are provided locally by the ISA 100 to remote computer 11, and that are modified by a user of the remote computer 11, will be updated on the RDM host processor 200. This is accomplished when the RDM remote file server 314 sends those updated files via connection 318 to WAN interface 106 for transmission to WAN 15, and through RAS server 17 to RDM host processor 200. In this manner, files stored on ISA 100 are mirror images of the files provided by the RDM host processor 200. Specifically, when a file that resides on one of the servers 21, 22 or 24 is mirrored to an ISA 100 and updated by a user of remote computer 11, that file is also updated on the server 21, 22 or 24 from which it originated.

RDM remote file server 314 also communicates with RDM contact manager 329 via connection 319. RDM contact manager 329 communicates via connection 318 through WAN interface 106 and ultimately with ISA contact manager 381 (FIG. 3B) within RDM host processor 200. The RDM contact manager 329 and the ISA contact manager 381 cooperate to provide the exchange of files between the ISA 100 and RDM host processor 200.

RDM remote file server 314 also communicates via connection 316 with differencing element 321, compress/decompress element 322 and encrypt/decrypt element 324. Differencing element 321 identifies only the differences (deltas) between a given file stored on the ISA 100 and a server on the corporate LAN 25. Compress/decompress element 322 uses well known algorithms to compress or decompress the deltas provided to it by differencing element 321. Encrypt/decrypt element 324 uses well known algorithms to encrypt or decrypt the compressed deltas provided to it by the compress/decompress element 322. By storing an original of a file in the ISA 100, and a series of deltas to it, the revisions to the file may be easily reconstructed, thereby allowing the files to be easily mirrored across the WAN 50.

RDM contact manager 329 also communicates with file/directory index data element 349 via connection 331. The file/directory index data element 349 indexes and stores metadata for the files or directories that are of interest as defined by the user/group/corporate policies stored in configuration data element 352. Metadata represents data about the data being stored in local storage element 356. For example, the metadata stored in file/directory index data element 349 may include the title, subject, author, and the size of a file stored in local storage element 356.

Simple network management protocol (SNMP) element 339 also communicates with WAN interface 106 via connection 335. SNMP element 339 is a software element, which allows monitoring of the ISA 100 via the WAN 15. Generally, the SNMP element 339 monitors runtime operation of the ISA 100 and passes health information back to a network management tool (not shown) running somewhere on the corporate LAN 25. Potentially the SNMP element 339 could also update some configuration information for the ISA 100 if the management application were sophisticated enough.

FIG. 3B is a block diagram illustrating the operation of the portion of the ISA software 300 that resides within the RDM host processor 200.

ISA remote file server 358 is a software component that connects to LAN 25 via connection 357 and corresponds to the RDM remote file server 314 of FIG. 3A. ISA remote file server 358 obtains, from local storage element 361 via connection 359, the data that is to be sent to the ISA 100 to allow mirroring of files to occur. ISA remote file server 358 also communicates via connection 374 with differencing element 356, compress/decompress element 377 and encrypt/decrypt element 378. The operation of differencing element 356, compress/decompress element 377 and encrypt/decrypt element 378 is similar to the operation of differencing element 321, compress/decompress element 322 and encrypt/decrypt element 324, respectively, as described above. Generally, and as described above, only compressed delta information relating to the files stored on the ISA 100 is exchanged between the ISA 100 and the RDM host processor 200. ISA remote file server 358 also communicates with ISA contact manager 381 via connection 362 to determine which data stored in local storage element 361 is to be transferred to ISA 100.

File/directory polling engine 366 is a software component that communicates with LAN 25 via connection 364 and communicates with file/directory index data element 399 via connection 367. File/directory polling engine 366 is the software element that, based on the user policies, group policies and corporate policies stored in configuration element 343 (FIG. 3A), checks for updates to any files on servers connected to the corporate LAN 25 that are listed in the policies stored in policy database 388. If the file/directory polling engine 366 finds any files that have been updated, and hence need to be mirrored to a given ISA 100, it notifies the ISA contact manager 381, which in turn queues a request to the ISA remote file server 358 via connection 362. Essentially, and assuming that more than one ISA 100 is part of the network, the files of interest to any remote ISA 100 may overlap. In order to avoid using excessive corporate LAN bandwidth by looking at the files of interest more than once, the polling engine polls the corporate LAN for the superset of files of interest to all ISA devices combined, and queues requests to ISA remote file server 358 via ISA contact manager 381. ISA remote file server 358 then gets any given file only once, performs the difference, compress and encrypt functions, and then stores that bit of data, ready for transmission over the WAN, in storage element 361.

Notification engine 372 connects to LAN 25 via connection 371 and is a software element that can be programmed to notify a remote user or a local user, for example via e-mail or some other notification means, when a file has been updated. Notification engine 372 communicates with file/directory polling engine 366 via connection 369 to obtain the file update information.

The ISA contact manager 381 connects to LAN 25 via connection 379 and corresponds to the RDM contact manager 329 of FIG. 3A. The ISA contact manager 381 is a software element that monitors ISA 100 for management purposes. ISA contact manager 381 communicates with RDM/ISA policy access and configuration element 386 via connection 382. RDM/ISA policy access and configuration element 386 communicates with policy database 388, which stores the RDM/ISA corporate, group and user policies that define the files that are mirrored to the ISA 100.

Web server 391 communicates with LAN 25 via connection 389 and is configured to allow the administration of ISA software 300 via the World Wide Web. Web server 391 corresponds, and is similar, to web server 337 in FIG. 3A. Web server 391 communicates with ISA user status monitoring element 396, which communicates with ISA status database 398 via connection 397. ISA user status monitoring element 396 monitors the status of any ISA 100 connected to WAN 15 and to LAN 25.

Figure 4A:
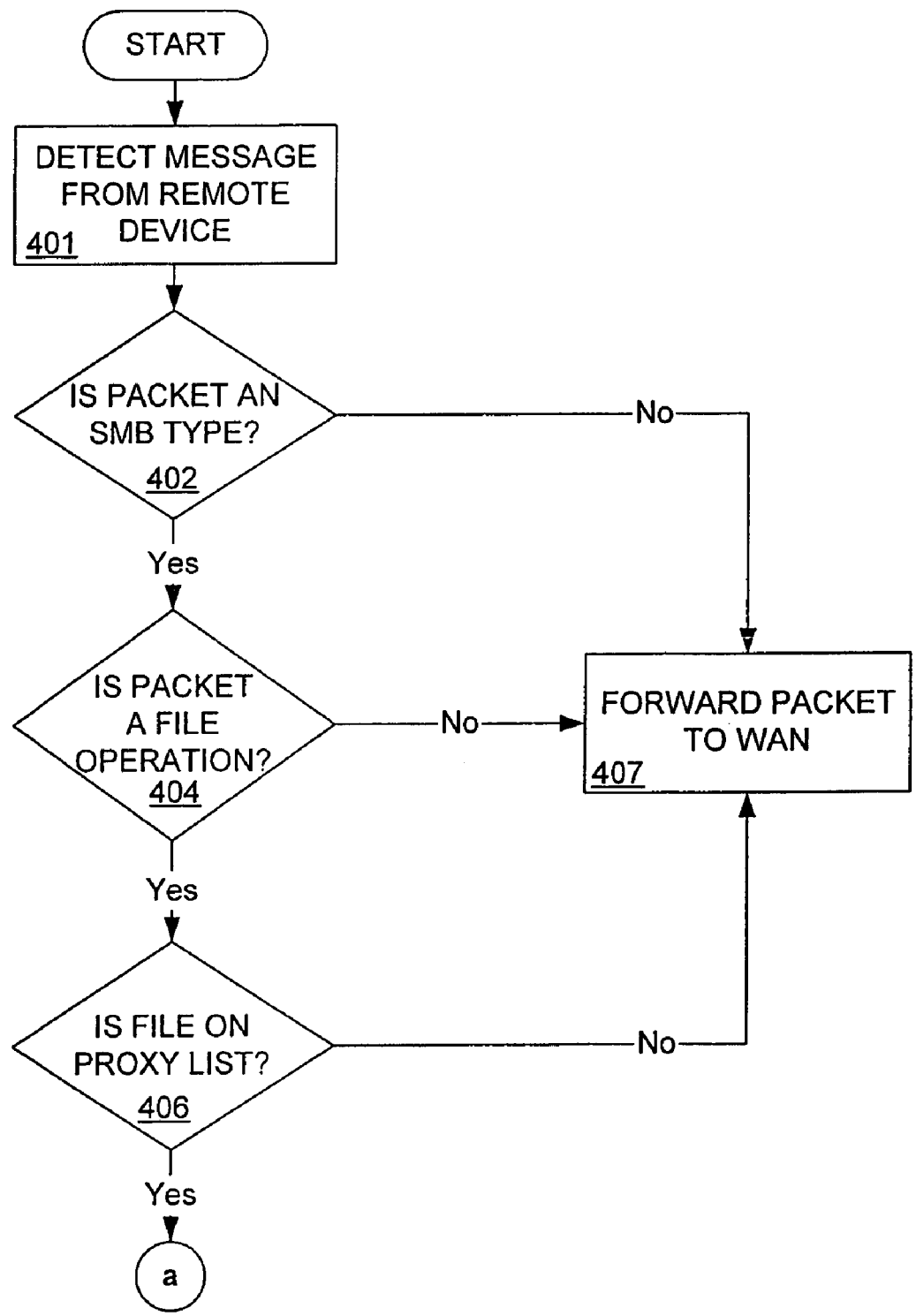
FIGS. 4A and 4B are flowcharts collectively illustrating the communication packet interception aspect of the invention.
Figure 4B:
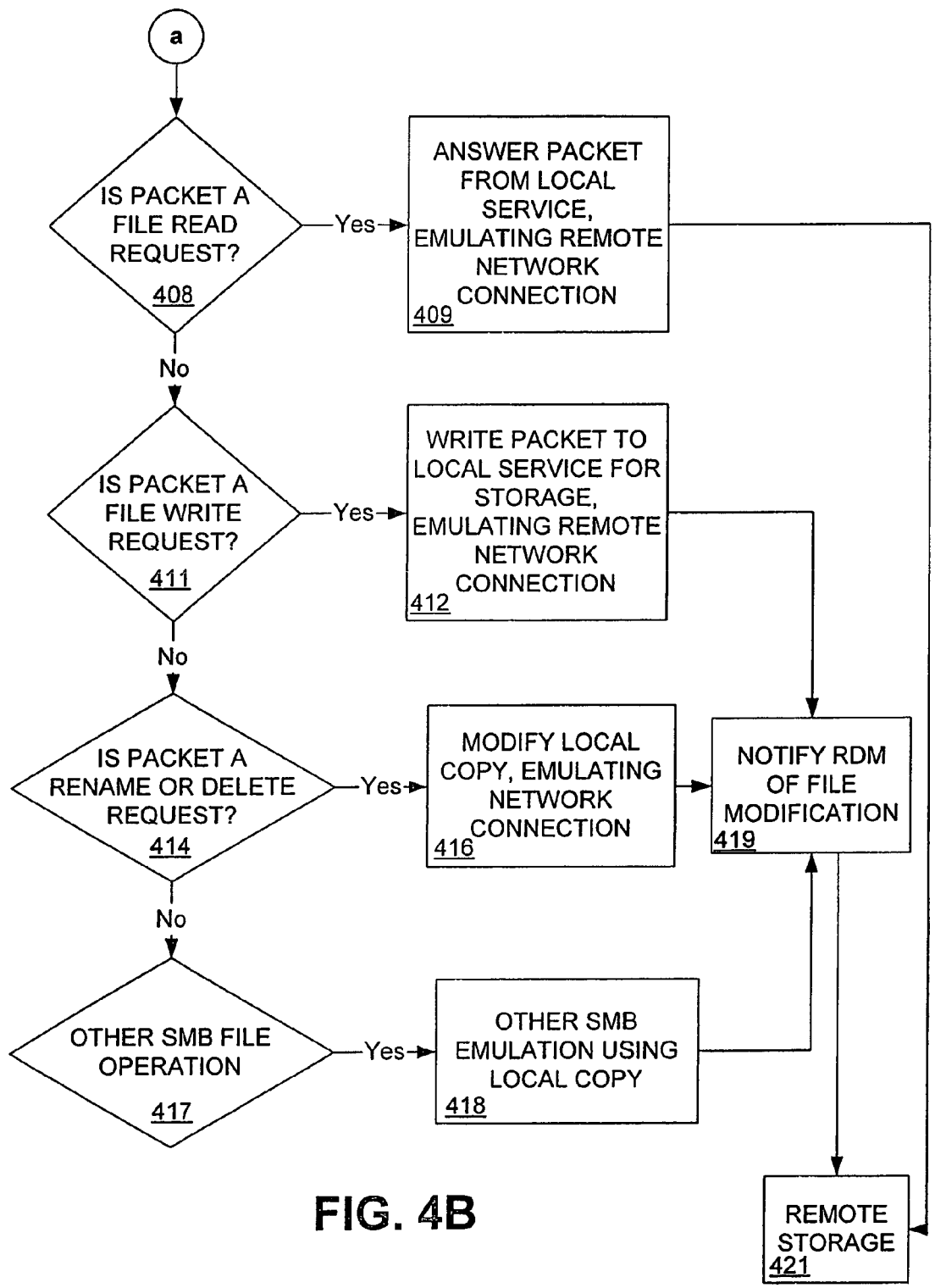

FIGS. 4A and 4B are flowcharts collectively illustrating the communication packet interception aspect of the invention. Any process descriptions or blocks in the following flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Referring now to FIG. 4A, in block 401, the file proxy routine 307 (FIG. 3A) detects a communication message from remote computer 11 (FIG. 1). In accordance with an aspect of the invention, file proxy routine 307 determines the type of communication message it has intercepted, and, based on the type of packet detected, determines whether to forward the packet to the WAN 15 for communication to LAN 25, or to service the packet itself in the ISA 100. Analysis is performed using well understood algorithms for analyzing International Standards Organization (ISO) level 3 and 4 packets, and is based on the CIFS 1.0/LM 0.12 specifications governing server message block (SMB)/common Internet file service (CIFS) communication.

In block 402, the file proxy routine 307 determines whether the intercepted packet is an SMB/CIFS packet type. An SMB packet type is also commonly referred to as a CIFS packet. If it is determined in block 402 that the packet is not an SMB/CIFS packet type, then, in block 407, the packet is forwarded by ISA 100 to WAN 15. If, in block 402, the packet is determined to be an SMB/CIFS type, then in block 404, the file proxy routine 307 determines whether the packet requests a file operation. If the packet does not request a file operation, then, in block 407, the packet is forwarded to WAN 15. If, in block 404, it is determined that the intercepted packet requests a file operation, the file proxy routine 307, in block 406, will determine whether the requested file is on the list of files in the user/group/corporate policy via RDM contact manager 329. This list includes the sum total of files/directories listed in a given ISA policy of which the ISA 100 currently has a local up-to-date copy. The RDM contact manager 329, having visibility into the file/dir index 349 and the configuration information (configuration database 352), maintains this synthesized list.

If, in block 406, the file proxy routine 307 determines that the requested file is not on the proxy list, then in block 407, the packet will be forwarded to WAN 15 for communication to LAN 25. If, in block 406, it is determined that the requested file is on the proxy list, then in block 408, the file proxy routine 307 determines whether the packet is a file "read" request.

If the file proxy routine 307 determines, in block 408, that the packet is a file read request, then in block 409 the file proxy routine 307 obtains the file from local storage element 356 (in block 421) and provides that file to the remote computer 11. In this manner, the ISA 100 emulates the remote network connection and transparently proxies the requested file to the remote computer 11.

If, in block 408, it is determined that the packet is not a file read request, then in block 411 the file proxy routine 307 determines whether the packet is a file "write" request. If the packet is a file write request, then the file proxy routine 309 will write the packet to local storage element 356 for storage, and emulate the remote network connection, thereby intercepting the packet and executing the request locally within the ISA 100. After the packet is written to local storage in block 412, in block 419 the file proxy routine 307 notifies the RDM contact manager 329 (FIG. 3A) and the RDM remote file server 314 (FIG. 3A) of the file modification so that the data necessary to reconstruct the modified file on the appropriate device (server 21, 22 or 24) connected to the corporate LAN 25 can be mirrored back (transferred) to the RDM host processor 200. The RDM host processor 200 then reconstructs the modified file on the appropriate server 21, 22 or 24, from which the file originated.

If, in block 411, it is determined that the packet was not a file write request, then in block 414 the file proxy routine 307 determines whether the packet contains a "rename" or "delete" request. If the packet detected by the file proxy routine 307 contains a rename or delete request, then in block 416 the file proxy routine 307 accesses the local copy of the file located in local storage element 356 (FIG. 3A) and modifies the metadata for the local copy, emulating the network connection to the remote computer 11, thereby providing the transparent file proxy function in accordance with that aspect of the invention. After the file proxy routine 307 modifies the local copy in local storage element 356, file proxy routine 307 will notify the RDM contact manager 329 and the RDM remote file server 314 so that the modified metadata for the local file can be mirrored back to the RDM host processor 200, and then to the appropriate server 21, 22 or 24.

If, in block 414, the file proxy routine 307 determines that the packet did not contain either a rename or delete request, then in block 417 the file proxy routine 307 determines that the intercepted packet is another SMB/CIFS file operation. Accordingly, in block 418 the SMB/CIFS emulation is performed using the locally stored file and in block 417 the file proxy routine 307 again notifies the RDM contact manager 329 and the RDM remote file server 314 that the local copy was modified. This causes the modified local copy to be mirrored back to the RDM host processor 200 and the appropriate server 21, 22 or 24.

It will be apparent to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

What is claimed is:

1. A method for transparent file proxying, the method comprising:

coupling a plurality of computing devices to a local area network, each of said plurality of computing devices including a local memory element containing a plurality of files, at least one of said plurality of computing device coupled to a wide area network;

coupling a remote memory element to said wide area network, said remote memory element configured to maintain a copy of the first file selected from said plurality of files contained in the local memory elements of said plurality of computing devices;

said at least one of said plurality of computing devices to a wide area communication network;

coupling a remote computing device to said remote memory element;

intercepting, in said remote memory element, an Internet Protocol (IP) communication message from said remote computing device, said IP communication message corresponding to a request from a first user to access a requested file; and providing information corresponding to said copy of said first file to said remote computing device from said remote memory element without said IP communication message traversing said wide area communication network and said local area network if the first user is authorized to access said requested file and if said requested file corresponds to said first file;

wherein, if the first user is authorized access, said remote memory element updates said copy of said first file in response to receiving information corresponding to a modification of said first file from said remote computing device; and wherein, after the remote memory element updates said copy of said first file, said remote memory device causes said first file to be updated.

2. The method of claim 1, wherein said at least one of said plurality of computing devices periodically updates said copy of said first file maintained in said remote memory element.

3. The method of claim 1, wherein said copy of said first file is chosen to be maintained in said remote memory element based upon at least one of a plurality of policies, wherein said plurality of policies are chosen from the group consisting of user policies, group policies and corporate policies.

4. The method of claim 1, wherein, in determining whether the first user is authorized access to said file, if the user is authorized access to said file but a copy of said file is not stored locally by said remote memory device, said remote computing device forwards said IP communication message via said wide area communication network and said local area network such that said remote computing device is able to retrieve a copy of said first file.

5. The method of claim 1, further comprising:
preventing the user from obtaining information corresponding to said file from said remote memory element if the user is not authorized access to said file.

6. A system for transparent file proxying, comprising:
a local network to which is coupled a plurality of computing devices, at least one of said plurality of computing devices including the ability to route communication packets to said remaining plurality of computing devices, each of said plurality of computing devices including a memory element containing a plurality of files;
a communication network coupled to said at least one of said plurality of computing devices;
a remote memory element coupled to said communication network;
a remote computing device connected to said remote memory element, said remote memory element configured to intercept an Internet Protocol (IP) communication message from said remote computing device, said remote memory element configured to maintain a copy of a first file selected from said plurality of files contained in the memory elements of said plurality of computing devices; and
wherein said remote memory element is configured to provide information corresponding to said copy of the first file to said remote computing device in response to said remote memory element:
intercepting said IP communication message from said remote computing device,
determining that the first user is authorized access, and
determining that said file corresponds to said first file, said IP communication message corresponding to a request from the first user to access said first file from one of said plurality of computing devices connected to said local network, thus providing information corresponding to said copy of the first file to said remote computing device without said IP communication message traversing said communication network and said local area network;
wherein said remote memory element updates said copy of said first file in response to receiving information corresponding to a modification of said first file from said remote computing device; and
wherein, after the remote memory element updates said copy of said first file, said remote memory device causes said first file to be updated.

7. The system of claim 6, wherein said at least one of said plurality of computing devices periodically updates said selected file maintained in said remote memory element.

8. The system of claim 6, wherein said copy of said first file is chosen to be maintained in said remote memory element based upon at least one of a plurality of policies, wherein said plurality of policies are chosen from the group consisting of user policies, group policies and corporate policies.

9. The system of claim 6, wherein, if the first user is authorized access, said remote memory element updates said copy of said first file in response to receiving information corresponding to a modification of said first file from said remote computing device.

10. The system of claim 6, wherein, in determining whether the first user is authorized access to said file, if the user is authorized access to said file but a copy of said file is not stored locally by said remote memory device, said remote computing device forwards said IP communication message via said wide area communication network and said local area network such that said remote computing device is able to retrieve a copy of said first file.

* * * * *

UNITED STATES PATENT AND TRADEMARK OFFICE
CERTIFICATE OF CORRECTION

PATENT NO. : 6,965,924 B1  
APPLICATION NO. : 09/558201  
DATED : November 15, 2005  
INVENTOR(S) : John David Gerthe Page 1 of 1

It is certified that error appears in the above-identified patent and that said Letters Patent is hereby corrected as shown below:

In column 7, line 7, delete "50" and insert -- 15 --, therefor.

In column 7, line 39, delete "356" and insert -- 376 --, therefor.

In column 7, line 41, delete "356" and insert -- 376 --, therefor.

In column 9, line 33, delete "309" and insert -- 307 --, therefor.

Signed and Sealed this

Sixteenth Day of November, 2010

David J. Kappos
*Director of the United States Patent and Trademark Office*